United States Patent [19]

Yamaguchi

[11] Patent Number: 5,106,812
[45] Date of Patent: Apr. 21, 1992

[54] CATALYST CARRIER FOR USE IN HIGH-TEMPERATURE COMBUSTION

[75] Inventor: Toshio Yamaguchi, Tokyo, Japan

[73] Assignee: Sumitomo Metal Mining Co. Ltd., Tokyo, Japan

[21] Appl. No.: 640,842

[22] Filed: Jan. 14, 1991

[30] Foreign Application Priority Data

Jan. 19, 1990 [JP] Japan .......................... 2-8162

[51] Int. Cl.$^5$ .......................................... B01J 32/00
[52] U.S. Cl. ............................................. 502/439
[58] Field of Search ............................ 502/202, 439

[56] References Cited

U.S. PATENT DOCUMENTS

| | | | |
|---|---|---|---|
| 2,339,247 | 1/1944 | Danforth | 502/202 |
| 2,392,588 | 1/1946 | Greenfelder et al. | 502/202 |
| 2,584,405 | 2/1952 | West | 502/202 |
| 2,835,637 | 5/1958 | Dowden et al. | 502/202 |
| 3,856,705 | 12/1974 | McArthur | 502/202 |

FOREIGN PATENT DOCUMENTS

| | | | |
|---|---|---|---|
| 719727 | 10/1965 | Canada | 502/202 |
| 1146854 | 5/1957 | France | 502/202 |

*Primary Examiner*—Carl F. Dees
*Attorney, Agent, or Firm*—Watson, Cole, Grindle & Watson

[57] ABSTRACT

A high-temperature combustion grade catalyst carrier usable fully satisfactorily even at 1,400° C. is a composite oxide consisting of silicon dioxide, boron oxide, and alumina, with a composition of 4 to 19% by weight of silicon dioxide, 3 to 10% by weight of boron oxide, and the balance to make up 100% by weight of alumina and morphologically a finely divided porous substance having a specific surface area of not less than 10 m$^2$/g.

4 Claims, No Drawings

CATALYST CARRIER FOR USE IN HIGH-TEMPERATURE COMBUSTION

BACKGROUND OF THE INVENTION

1. Field of the Invention

This invention relates to a catalyst carrier with excellent refractory properties and befitting a high-temperature reaction such as catalytic combustion.

2. Description of the Prior Art

The method of catalytic combustion which effects fuel combustion through the assistance of a catalyst allows the combustion to proceed at a lower temperature and depresses the occurrence of themal $NO_x$ as compared with the conventional method of combustion without the use of a catalyst and, as such, has been attracting keen attention recently from the standpoint of prevention of air pollution.

Incidentally, since the temperature of the reaction caused by the method of catalytic combustion exceeds 1,000° C., the catalyst to be used for the reaction must possess refractory properties, and particularly, the catalyst carrier serving to retain a reactive component in a highly dispersed state is required to possess these high refractory properties. The catalyst carrier has specific surface area as one of the important qualities. For the catalyst carrier to retain the reactive component in a highly dispersed state, it is necessary that the specific surface area of the catalyst carrier should be sufficiently large. The catalyst carrier with high refractory properties, therefore, must be a carrier capable of retaining a large specific surface area even at high temperatures. Specifically, it is required to retain a specific surface area exceeding 10 $m^2/g$.

At present, a carrier formed mainly of $\gamma$-alumina is used most widely as a refractory carrier possessing a large specific surface area. The $\gamma$-alumina, however, undergoes thermal transformation into $\alpha$-alumina accompanied by abrupt sintering and loss of specific surface area i.e. to the extent of ceasing to function as part of a carrier, when it is heated to 1,200° C.

As a solution to this problem, the present inventors have already proposed a catalyst carrier for high-temperature combustion which comprises alumina and boron oxide.

At temperatures in the neighborhood of 1,200° to 1,300° C., this catalyst carrier can be effectively used because the specific surface area of this carrier is slightly under 30 $m^2/g$ at 1,200° C. and somewhere between 10 to —$m^2/g$ at 1,300° C. An attempt to use this catalyst carrier in the neighborhood of 1,400° C., however, fails because the carrier undergoes sintering with a serious loss of its specific surface area to 4 to 5 $m^2/g$.

The objective of this invention is to provide a catalyst carrier which is used optimally for catalytic combustion even in the neighborhood of 1,400° C.

SUMMARY OF THE INVENTION

The catalyst carrier for high-temperature combustion which is provided by this invention as a solution for the problem mentioned above is compositionally a complex oxide of silicon dioxide, boron oxide, and alumina, containing 4 to 19% by weight of silicon dioxide and 3 to 10% by weight of silicon, and morphologically a finely divided porous substance possessing a specific surface area of not less than 10 $m^2g$.

DETAILED DESCRIPTION OF THE INVENTION

As regards raw materials which are usable for the production of the porous substance mentioned above, those for silicon dioxide include silicates such as sodium silicate, silicon tetrachloride and silica sol, those for alumina include water-soluble aluminum salts such as aluminum nitrate, aluminum sulfate, aluminum chloride, and sodium aluminate, and those for boron include orthoboric acid, metaboric acid, tetraboric acid, and water-soluble salts of such acids, for example.

The catalyst carrier of this invention for high-temperature combustion may be used in its unmodified powdered form. Optionally it may be used in any of the conventional carrier shapes such as cylinders, spheres, and honeycomb which are common to catalyst carriers.

In the high-temperature combustion grade catalyst carrier of this invention, the content of $SiO_2$ is limited to the range of 4 to 19% by weight (hereinafter referred to briefly as "%") and that of $B_2O_3$ to the range of 5 to 15%. The reason for this range is that when a catalyst carrier has a content outside this range defined above, it loses its refractory properties, undergoes sintering. The carrier therefore suffers from a serious decline of specific surface area and fails to retain the specific surface area above the level of 10 $m^2/g$, i.e. the minimum magnitude any catalyst carrier is required to possess for fulfillment of its role.

For the manufacture of the catalyst carrier of this invention, any of the conventional methods such as the mixing method which have been popularly used for the manufacture of a catalyst carrier may be employed. For example, a method made be used which effects the manufacture by mixing an aqueous aluminum sulfate solution with an aqueous sodium aluminate and hydrolyzing the resultant mixture, thereby forming hydrated lamina slurry. Sodium silicate is added to the slurry, thereby obtaining hydrated alumina-silica, followed by a stated amount of an aqueous orthoboric acid to the hydrated alumina-silica, mixing them, drying the resultant mixture, and subsequently firing the dried mixture at 1,200° to 1,400° C.

The fact that the catalyst carrier of this invention possesses high refractory properties may be logically explained by a postulate that the composite oxide fired at temperatures of 1,200° to 1,400° C possesses stability and comprises crystals containing a highly refractory mullite structure and aluminum borate structure. Generally, the mullite structure has a composition of $3Al_2O_3 \cdot 2SiO_2$ and the aluminum borate structure a composition of $9Al_2O_3 \cdot 2B_2O_3$, which are both orthorhombic crystalline structures. In the catalyst carrier of the present invention, it is considered that excess $Al_2O_3$ passes into the mullite and forms a solid solution therein and this excess $Al_2O_3$ is allowed to bind itself with $B_2O_3$, giving rise to a $9Al_2O_3$ phase, thus manifesting the high refractory properties.

The firing temperature is limited to the range of 1,200° to 1,400° C. The reason for this particular range is that the catalyst carrier of this invention is intended to be used at temperatures falling in this range.

For more specific details of the present invention, the following examples are presented which are intended to be merely illustrative of and not in any sense limitative of the invention.

EXAMPLE 1

In a stainless steel reaction vessel having an inner volume of 30 liters and provided with a stirrer, 16.5 liters of water was placed, 3,180 g of an aqueous solution containing 258 g of aluminum sulfate as alumina was added to the water and heated to and kept at 70° C. therein, and an aqueous solution containing 425 g of sodium aluminate as alumina was added dropwise thereto as kept in a stirred state, to obtain a hydrated alumina slurry of a pH value of 9.0. Then, the slurry and 38 g of nitric acid 30% in concentration were combined to form a mixture of a pH value of 5.4 and the resultant mixture and 1,215 g of an aqueous solution containing 170 g of sodium silicate as SiO added dropwise thereto in a stirred state were combined to form a hydrated alumina-silica mixture of a pH value of 8.5. This hydrated mixture was filtered, washed, and spray dried to give rise to a hydrated alumina-silica powder. A slurry was produced by stirring for 30 minutes 650 g of this hydrated alumina-silica powder (507 g of the hydrated mixture as alumina-silica in a solution obtained in advance by dissolving 47.2 g of special grade reagent orthoboric acid (26.7 g as $B_2O_3$) in 1,180 ml of hot water at 80° C. A high-temperature combustion grade catalyst carrier, A-1, consisting of 76.0% of $Al_2O_3$, 19.0% of $SiO_2$, and 5.0% of $B_2O_3$ was obtained by drying part of the slurry at 110° C. for 24 hours and firing the dried slurry in an electric oven at 1,300° C. for 3 hours. A high-temperature combustion grade catalyst carrier, A-2, having a $B_2O_3$ content of 15% was obtained by heating and kneading the remainder of the slurry in a kneader, molding the kneaded slurry in an extrusion molding device possessing a die 1.5 mm in diameter, drying the molded mass, and firing it in an electric oven at 1,300° C. for 3 hours. By a test carried out in accordance with the BET method using nitrogen, the catalyst carriers were found to have 27 and 26 m²/g, respectively, of specific surface area. Thus, they were found to be usable and fully satisfactorily as catalyst carriers at 1,300° C.

EXAMPLE 2

A high-temperature combustion grade catalyst carrier, B-1, comprising 77.6% of $Al_2O_3$, 19.4% of $SiO_2$, and 3.0% of $B_2O_3$ and a high-temperature combustion grade catalyst carrier, C-1, consisting of 72.0% of $Al_2O_3$, 18.0% of $SiO_2$, and 10.0% of $B_2O_3$ were produced by following the procedure used for the manufacture of A-1 in Example 1, excepting the amount of orthoboric acid added was varied. A high-temperature combustion grade catalyst carrier, B-2, consisting of 77.6% of $Al_2O_3$, 19.4% of $SiO_2$, and 3.0% of $B_2O_3$ and a high-temperature combustion grade catalyst carrier, C-2, consisting of 72.0% of $Al_2O_3$, 18.0% of $SiO_2$, and 10.0% of $B_2O_3$ were produced by following the procedure used for the manufacture of A-2 in Example 1 except that the amount of orthoboric acid added was varied. These catalyst carriers were tested for specific surface area in the same manner as in Example 1. It was consequently found that the high-temperature combustion grade catalyst carriers, B-1, C-1, B-2, and C-2, possessed 22, 23, 22, and 23 m²/g respectively of specific surface area and were usable fully satisfactorily as catalyst carriers at 1,300° C.

EXAMPLE 3

A high-temperature combustion grade catalyst carrier, D-1, consisting of 90.2% of $Al_2O_3$, 4.8% of $SiO_2$, and 5.0% of $B_2O_3$ and a high-temperature combustion grade catalyst carrier, E-1, consisting of 84.5% of $Al_2O_3$, 10.5% of $SiO_2$, and 5.0% of $B_2O_3$ were produced by following the procedure used for the manufacture of A-1 of Example 1. These catalyst carriers were tested for specific surface area in the same manner as in Example 1. It was consequently found that the high-temperature combustion grade catalyst carrier, D-1, had a specific surface area of 24 m²/g and the catalyst carrier, E-1, a specific surface area of 28 m²/g and that they both were usable fully satisfactorily as catalyst carriers at 1,300° C.

EXAMPLE 4

The aforementioned high-temperature combustion grade catalyst carriers, A-1, D-1, and E-1, were fired at 1,400° C for 3 hours and then tested for specific surface area in the same manner as in Example 1. It was consequently found that these catalyst carriers had 11, 10, and 12 m²/g respectively of specific surface area and that they were all satisfactorily usable as catalyst carriers at 1,400° C.

COMPARATIVE EXPERIMENT 1

In a stainless steel reaction vessel having an inner volume of 30 liters and provided with a stirrer, 16.5 liters of water was placed and heated to and kept at 70° C. and 3,180 g of an aqueous solution containing 258 g of aluminum sulfate as alumina and an aqueous solution containing 425 g of sodium aluminate were simultaneously added thereto and stirred therewith over a period of 15 minutes in such a manner as to keep the pH value of the resultant mixture in the range of 8 to 8.5. Consequently, a hydrated alumina slurry was obtained. Then, this slurry was filtered, washed, and spray dried to form a hydrated alumina. A slurry was obtained by stirring for 30 minutes 650 g of this hydrated alumina (507 g as alumina) in a solution prepared in advance by dissolving 158.4 g of special reagent grade orthoboric acid (89.5 g as $B_2O_3$) in 3,960 ml of hot water at 80° C. A high-temperature combustion grade catalyst carrier, R-1, having a $B_2O_3$ content of 15% was obtained by drying part of this slurry at 110° C. for 24 hours and firing the dried slurry in an electric oven at 1,300° C. for 3 hours. A high-temperature combustion grade catalyst carrier, R-2, having a $B_2O_3$ content of 15% was obtained by heating and kneading the remainder of the slurry, molding the kneaded slurry with an extrusion molding device provided with a die 1.5 mm in diameter, drying the molded mass, and firing the molded mass in an electric oven at 1,300° C. for 3 hours. These catalyst carriers, by a test for specific surface area carried out in the same manner as in Example 1, were found to have 13 and 12 m²/g respectively of specific surface area. It was found that though these catalyst carriers were inferior to those confirming to the present invention, they were acceptable as high-temperature combustion grade catalyst carriers.

Subsequently, these catalyst carriers were heated at 1,400° C. for 3 hours and tested for specific surface area in the same manner as described above. It was consequently found that the catalyst carriers possessed 5 and 4 m²/g respectively of specific surface area and were unusable as high-temperature combustion grade catalyst carriers at 1,400° C.

COMPARATIVE EXPERIMENT 2

An alumina-silica composite oxide carrier, R-3, consisting of 80.0% of $Al_2O_3$ and 20.0% of $SiO_2$ was obtained by preparing a hydrated alumina-silica powder in the same manner as in Example 1 and firing this powder in an electric oven at 1,300° C. for 3 hours. Then, a high-temperature combustion grade catalyst carrier, R-4, having a $SiO_2$ content of 20% was obtained by heating and kneading a hydrated alumina-silica slurry with a kneader, molding the kneaded slurry with an extrusion molding device provided with a die 1.5 mm in diameter, drying the molded mass, and firing the dried mass in an electric oven at 1,300° C. for 3 hours. These catalyst carriers, by a test for specific surface area carried out in the same manner as in Example 1, were found to possess invariably 17 $m^2/g$ of specific surface area. It was further found that though they were inferior to the catalyst carriers conforming to the present invention, they were usable fully satisfactorily as high-temeprature combustion grade catalyst carriers.

These high-temperature combustion grade catalyst carriers were heated at 1,400° C. for 3 hours. It was found by a test carried out in the same manner as described above that they possessed 5 and 4 $m^2/g$ respectively of specific surface area and were unusable as high-temperature combustion grade catalyst carriers.

While the present invention has been described by means of specific embodiments, it is to be understood that numerous changes and modifications may be made therein without departing from the spirit and scope of the invention as defined in the appended claims.

The carrier of this invention retains outstanding refractory properties and possesses a high specific surface area even at 1,400° C. and, therefore, can be used advantageously as a catalyst carrier for catalytic combustion performed not only at temperatures in the range of 1,200° to 1,300° C but also at such high temperature as in the neighborhood of 1,400° C.

What is claimed is:

1. A composite oxide catalyst carrier for use in high-temperature combustion which has a specific surface area of at least 10 $m^2/g$ and which consists of 4 to 19% by weight of silicon dioxide, 3 to 10% by weight of boron oxide and a balance to make up 100% by weight of alumina, and characterized by orthorhombic crystalline mullite ($3Al_2O_3 \cdot 2SiO_2$) and orthorhombic crystalline aluminum borate ($9Al_2O_3 \cdot 2B_2O_3$).

2. A catalyst carrier according to claim 1, wherein the raw material for silicon dioxide is one member selected from the group consisting of sodium silicate, silicon tetrachloride, and silica sol.

3. A catalyst carrier according to claim 1, wherein the raw material for boron is one member selected from the group consisting of orthoboric acid, metaboric acid, tetraboric acid, and water-soluble salts of said acids.

4. A catalyst carrier according to claim 1, wherein the raw material for alumina is one member selected from the group consisting of aluminum nitrate, aluminum sulfate, aluminum chloride, and sodium aluminate.

* * * * *